United States Patent
Burke, Jr.

(10) Patent No.: US 7,142,957 B2
(45) Date of Patent: Nov. 28, 2006

(54) JOURNEY EVENT SEQUENCING FOR AUTOMATED DRIVERLESS VEHICLES

(75) Inventor: Howard B. Burke, Jr., Wareham, MA (US)

(73) Assignee: HBB Assets, Ltd., Wareham, MA (US)

( * ) Notice: Subject to any disclaimer, the term of this patent is extended or adjusted under 35 U.S.C. 154(b) by 0 days.

(21) Appl. No.: 11/415,517

(22) Filed: May 2, 2006

(65) Prior Publication Data

US 2006/0247830 A1    Nov. 2, 2006

Related U.S. Application Data

(60) Provisional application No. 60/676,516, filed on May 2, 2005.

(51) Int. Cl.
    *G05D 1/00* (2006.01)
    *G08G 1/00* (2006.01)

(52) U.S. Cl. ............... 701/23; 701/24; 701/117; 104/300

(58) Field of Classification Search ............ 701/23, 701/24, 117, 118, 119; 104/295, 296, 300; 246/167 R, 182 B, 182 C, 187 B, 187 C
See application file for complete search history.

(56) References Cited

U.S. PATENT DOCUMENTS

| | | | | |
|---|---|---|---|---|
| 3,687,082 A | * | 8/1972 | Burke, Jr. ............... 104/298 |
| 3,880,088 A | * | 4/1975 | Grant ..................... 104/168 |
| 4,296,901 A | * | 10/1981 | Perrott ................ 246/167 R |
| 4,301,899 A | * | 11/1981 | McSparran et al. ......... 191/3 |
| 5,187,664 A | * | 2/1993 | Yardley et al. ............ 701/23 |
| 5,511,749 A | * | 4/1996 | Horst et al. .......... 246/187 A |
| 6,169,954 B1 | * | 1/2001 | McCrary ................ 701/117 |
| 6,198,994 B1 | * | 3/2001 | McCrary ................. 701/24 |

* cited by examiner

*Primary Examiner*—Richard M. Camby
(74) *Attorney, Agent, or Firm*—John M. Brandt

(57) ABSTRACT

An improved system for supplying electric power to and automatically controlling the speed of driverless electrically motivated wheeled vehicles on a guideway utilizing a plurality of guideway disposed power busses, each supplied by a sequentially variable frequency power supply. The vehicle is propelled by an electric motor sequentially in contact with the busses. The speed of the motor is controlled by the particular power frequency encountered at each buss while the vehicle moves forward on the guideway. One or more designated stop and start zones are selected for stop and start journey events in which the busses within the zone are alternatively powered by either a series of power supplies emitting frequencies at which the vehicle will decelerate to a stop or a series of power supplies emitting frequencies at which the vehicle will accelerate forward from a stopped position or alternatively continue in the normal course of travel. A switching device selects one or the other series of power supplies depending upon the desired course of action.

2 Claims, 2 Drawing Sheets

JOURNEY EVENT SEQUENCING FOR AUTOMATED DRIVERLESS VEHICLES

CROSS-REFERENCE TO RELATED APPLICATIONS

This application is based on the disclosure of Provisional Application Ser. No. 60/676,516 filed May 2, 2005 by the same inventor which is hereby incorporated by reference.

BACKGROUND OF THE INVENTION

1. Field of the Invention

The invention resides in the field of ground based transportation systems for passengers or freight and more particularly relates to apparatus for the programmable control of electric vehicles.

2. Description of the Prior Art

This invention relates to an improvement in the transportation system concept disclosed in U.S. Pat. No. 3,687,082 by the same applicant. The method and apparatus employed in that system provide for vehicle speed control by the sequential application of multiple electrical power sources of varying frequencies to an electric motor used to power the vehicle.

The vehicle sequentially receives power from a plurality of groups of guideway based busses connected to power supplies which generate a programmed succession of varying frequencies power waves.

The busses are reached through a vehicle connector extension or pickup, a brush or rotary device for example. As the vehicle moves forward on a guideway, separate insulated busses are sequentially connected to the propulsion motor which responds to the power supplied at each contact depending upon the power frequency encountered. The design parameters of motor, power supply frequency, buss spacing, and vehicle speed are selected to bring about a desired result of vehicle mobility pattern.

In particular, the power frequency supplied to each buss is sequentially varied such that, if the vehicle moves continuously at a desired speed, it is always supplied with power of a frequency that results in the motor producing sufficient torque to propel the vehicle at synchronous velocity. If the vehicle slows down or speeds up as a result of grade or load changes it will encounter a power frequency which will cause it to run faster or slower as the case may be. As the velocity of the vehicle adjusts, the motor will again synchronize with a power source frequency that will result in a desired rate of travel.

SUMMARY OF THE INVENTION

The invention may be summarized as an improved arrangement for stopping and starting a vehicle at a predetermined stopping zone location. The method and apparatus of the invention provide for the use of the basic multiple buss technique described above. In the invention, the output of two separate sets of power supplies are routed to busses situated in the stopping zone location. One set provides a series of frequencies for decelerating and stopping the vehicle; the other, system run set for running or continuing the vehicle on it's journey, i.e., not stopping or, if the vehicle has been stopped, accelerating the vehicle to return to travel speed. The supply sets, both system run and stopping, are switched back and forth depending upon the desired mode of operation. Thus, when a vehicle enters a stopping zone, if a stop is desired, a set of decelerating power frequencies will be applied to the busses positioned therein and the vehicle will stop. After completion of the planned activity within the zone, unloading and loading passengers for example, system run power will be reapplied to bring the vehicle back to travel speed. If a stop is not desired, the set of busses in the stopping zone will remain powered by the system set and the stopping set will remain unconnected.

As in the system as disclosed in the basic U.S. Pat. No. 3,687,082, stopping and stating is accomplished by routing the vehicle off the main path to a dedicated set of decelerating power supply busses so that other vehicles may continue to utilize the main guideways. In the present invention, the need for routing the vehicle to a special stop station is eliminated, the journey event process being accomplished completely by electronic switching of the power supplies rather than mechanical switching of the vehicle location.

DESCRIPTION OF THE PREFERRED EMBODIMENT

An essential maneuver for the automatic control system described above is the stopping and starting of the vehicles at selected locations in as uncomplicated a manner as possible. This provides the ability to on and off load cargo and passengers as the needs of the system require. The use of mechanical stopping devices such as brakes will add complexity, add cost, and will reduce reliability. This invention employs the operating principal of power frequency manipulation which is basic to the inventor's previously disclosed concept to accomplish this essential function.

Figure 1:
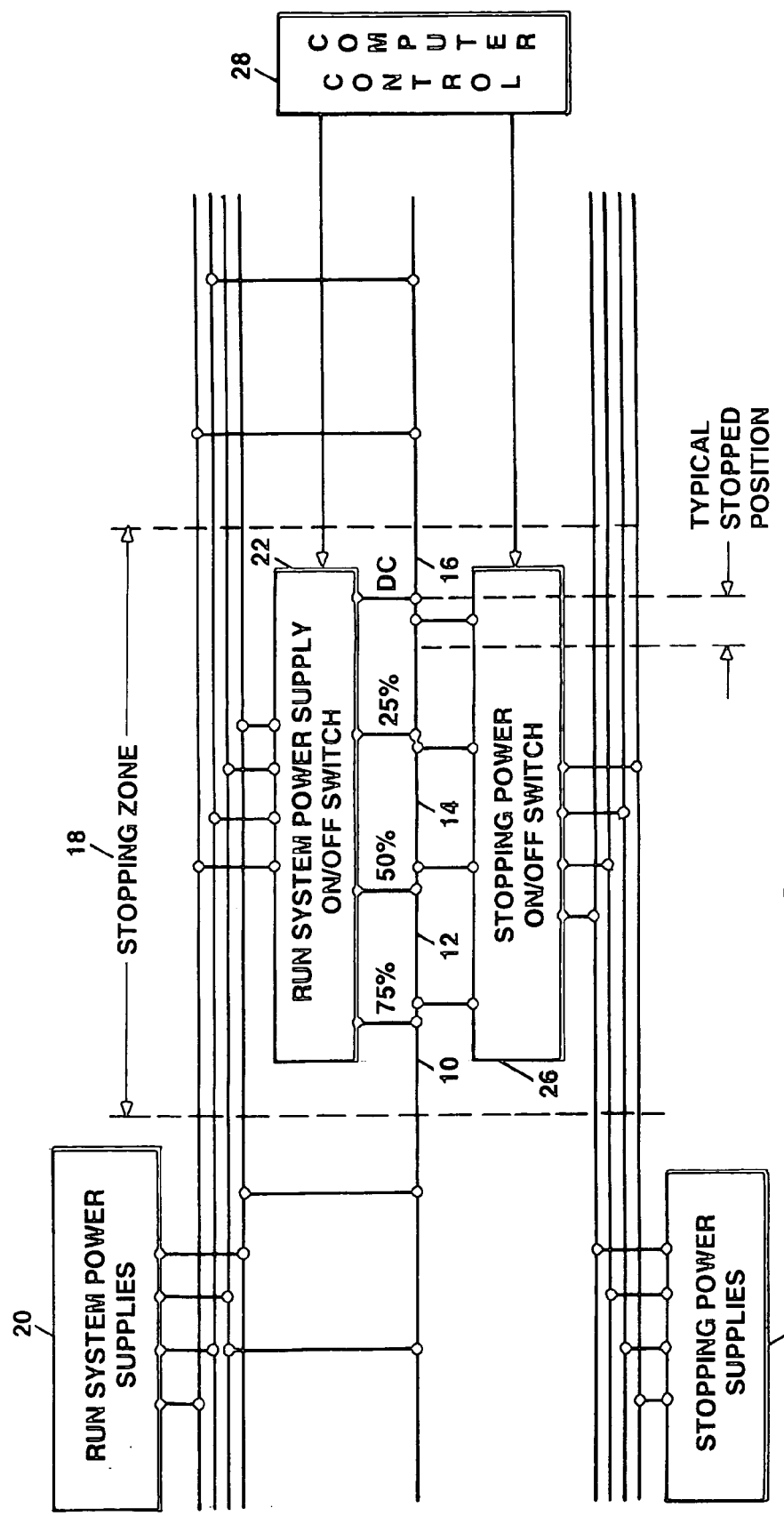
FIG. 1 is a schematic diagram illustrating the various components of the preferred embodiment of the invention and their electrical interconnection.

FIG. 1 is an electrical schematic of the circuitry designed to stop and start vehicles traveling in the main road or guideway of the system. Four center power distribution segments 10, 12, 14, and 16 define a typical stopping zone 18. Note that the number of segments will vary depending on circumstances. For example, a passenger transport system stopping and starting zone may have ten or more stopping segments to enable a smother stopping and starting sequence. Power to the guideway mounted power distribution segments within this zone can be provided from one of two sources, the system run power supplies 20 through the system run power on/off switch 22 or the stopping power supplies 24 through the stopping power on/off switch 26, or alternatively through a single three-way switch not shown.

A central control computer 28 is employed to schedule and control vehicle activity. When computer 28 directs the vehicle to pass through the stopping zone without stopping, system run power on/off switch 22 is closed and propulsion power is delivered to vehicles from system power supplies 20 that propel vehicles along the guideway. Stop power on/off switch 26 is open so that stopping power is not applied. When central computer 28 schedules a vehicle to stop in stopping zone 18, computer 28 first signals run power on/off switch 22 to open as the vehicle enters the stopping zone thereby removing power from the vehicle. Precise timing of switch closures is dependent upon a variety of factors such as vehicle stopping time and distance and the final intended stopping point. Shortly thereafter, stop power on/off switch 26 is closed and stopping power is applied to power distribution segments 10, 12, 14, and 16 within the stopping zone. It should be noted that stopping zone 18 may or may not be equal in length to the system headway length and stopping power may or may not be applied to all the power distribution power segments within the stopping zone.

When the vehicle power collector collects power from the first guideway power distribution segment 10 within the power zone, the propulsion motor will decelerate the vehicle since the power delivered to the motor will be at a frequency well below the normal operating synchronous or zero torque frequency causing the vehicle motor to regenerate power back into stopping power supplies 24. Arrival at the second power segment 12 will cause further deceleration due to a still lower frequency. The third segment will cause the vehicle velocity to be lowered to a still lower speed and arrival on the DC power segment will decelerate the vehicle to a stop and magnetically lock the propulsion motor rotor to hold the vehicle in the stopped position. In some circumstances, it may be desirable to place a slight depression or other restraining mechanism in the guideway where a wheel will sit when stopped to keep the vehicle from moving when DC power is removed.

When control computer 28 directs the vehicle to start up, it will reverse the above procedure by reapplying system run power to power segments 10, 12, 14, and 16 through run power switch 22 causing the vehicle to start and accelerate up to synchronous speed. As with stopping, the timing of running power application must be consistent with the acceleration rate of the vehicle and positioning of the vehicle within the control section.

Figure 2A:
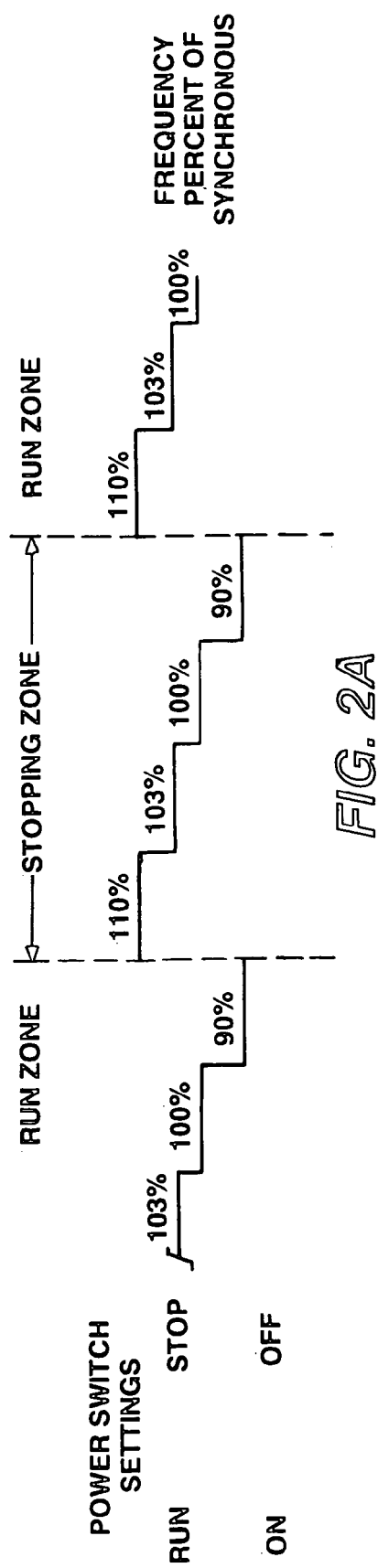
FIGS. 2A and B are graphs of power supply frequency versus time for both run and stop modes of the system of FIG. 1.
Figure 2B:
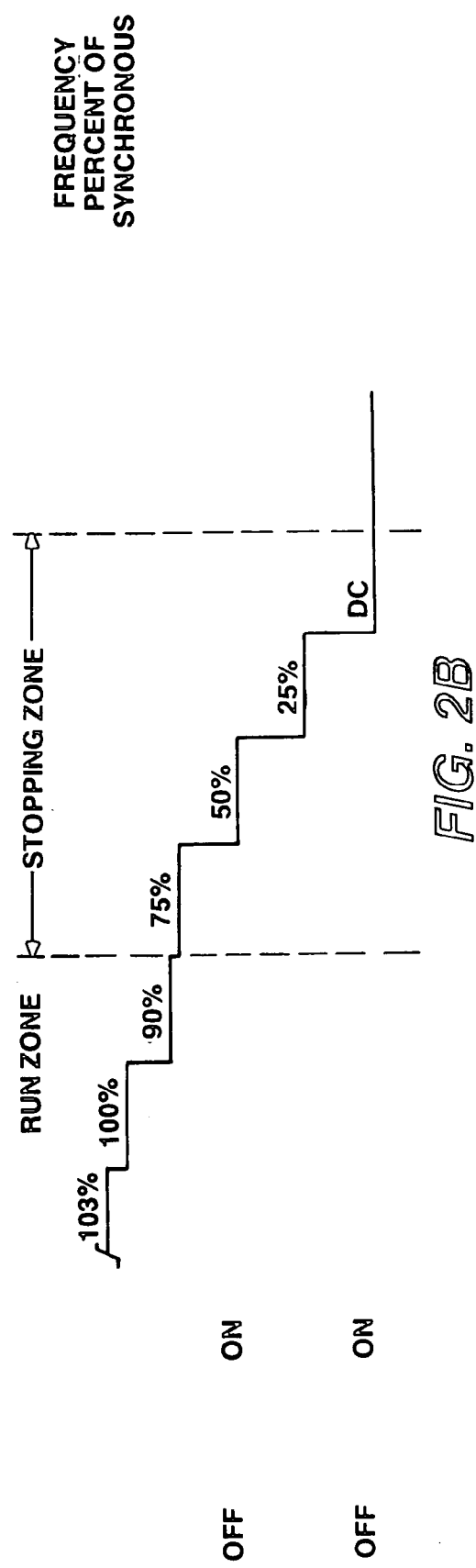

Referring to FIGS. 2A and 2B, the power frequencies at successive times within the stopping zone are shown. In FIG. 2A, the run power supplies are applied and the stopping power supplies are disengaged. Frequency is shown as a percent of the synchronous frequency at which the vehicle will maintain constant speed for no-load conditions. The actual frequency will depend upon the design and parameters of the system. In FIG. 2B, stopping power is applied and the frequency is reduced to zero over successive segments.

As variations in the above described description of the preferred embodiment will now be obvious to those skilled in the art, the invention is accordingly defined by the following claims.

What is claimed is:

1. In an automatic vehicle operation system for controlling the speed of vehicles traveling in a single direction over a guideway said system consisting of:
   a. a plurality of successive electrical power segments spaced one from another along at least a substantial portion of the length of said guideway;
   b. a vehicle for traveling along said guideway;
   c. a driving induction motor disposed in said vehicle;
   d. means for coupling said power segments to said motor; and
   e. a first plurality of electrical power source means coupled to said power segments for producing a series of traveling power frequency waves along said guideway, each of said power segments being at a frequency different from that of the other of said segments within a wave, said induction motor receiving with respect to a predetermine wave a preceding or succeeding segment of a frequency as to decrease the torque of said induction motor in response to an increase in vehicle speed and to increase the torque of said induction motor in response to a decrease in vehicle speed from the effective speed of said predetermined wave as it travels along said power rails;
   the improvement which comprises the establishment of at least one zone in said roadway utilizing those power segments within said zone for stopping and starting said vehicle comprising in combination:
   i. a selected series of said power segments within said zone arranged to receive said traveling waves to create a starting and traveling condition;
   ii. a second plurality of electrical power source means coupled to said selected series of power segments for providing a series of decreasing power frequencies at each of said selected series of power segments with respect to the direction of travel of said vehicle to create a stopping condition; and
   iii. switching means interposed between said first plurality of electrical power source means, said second plurality of electrical power source means and said selected series of power segments whereby either said first or second plurality of electrical power source means will be connected to said selected series of power segments at any particular time.

2. The system of claim 1 further including a computer connected to said switching means whereby the operation of said switching means is controlled by said computer.

* * * * *